United States Patent
Kato et al.

(10) Patent No.: US 7,612,939 B2
(45) Date of Patent: Nov. 3, 2009

(54) TRANSMISSIVE PHASE PLATE, POLARIZED BEAM SPLITTER, AND PROJECTION DISPLAY

(75) Inventors: Shigeru Kato, Tochigi (JP); Takuya Komatsu, Tochigi (JP); Yoshiji Kawamura, Tochigi (JP)

(73) Assignee: Fujinon Corporation, Saitama-shi (JP)

( * ) Notice: Subject to any disclaimer, the term of this patent is extended or adjusted under 35 U.S.C. 154(b) by 376 days.

(21) Appl. No.: 11/556,406

(22) Filed: Nov. 3, 2006

(65) Prior Publication Data
US 2007/0104073 A1 May 10, 2007

(30) Foreign Application Priority Data
Nov. 10, 2005 (JP) .............................. 2005-326282

(51) Int. Cl.
G02B 5/30 (2006.01)
G02B 27/28 (2006.01)

(52) U.S. Cl. .................. 359/487; 359/495; 359/583; 359/247; 359/263

(58) Field of Classification Search ................ 359/495, 359/496, 583, 247, 263, 487
See application file for complete search history.

(56) References Cited

U.S. PATENT DOCUMENTS

| | | | | |
|---|---|---|---|---|
| 4,406,520 A | * | 9/1983 | Sato | 359/487 |
| 4,653,875 A | * | 3/1987 | Hines | 359/487 |
| 4,664,490 A | * | 5/1987 | Rol | 351/219 |
| 5,142,411 A | * | 8/1992 | Fiala | 359/494 |
| 5,237,442 A | * | 8/1993 | Khoe et al. | 398/203 |
| 5,381,278 A | * | 1/1995 | Shingaki et al. | 359/256 |
| 5,568,315 A | * | 10/1996 | Shuman | 359/487 |
| 5,644,428 A | * | 7/1997 | Heinrich | 359/494 |
| 6,072,635 A | * | 6/2000 | Hashizume et al. | 359/640 |
| 6,172,815 B1 | * | 1/2001 | Hashizume et al. | 359/640 |
| 6,342,971 B1 | * | 1/2002 | Hashizume et al. | 359/634 |
| 6,411,449 B1 | * | 6/2002 | Hashizume et al. | 359/634 |
| 6,426,837 B1 | * | 7/2002 | Clark et al. | 359/485 |

* cited by examiner

Primary Examiner—Ricky D Shafer
(74) Attorney, Agent, or Firm—Oblon, Spivak, McClelland, Maier & Neustadt, L.L.P.

(57) ABSTRACT

A transmissive phase plate with a function of correcting direction of polarization of light rays in an incident divergent or convergent light flux in addition to functions as a wave plate. Conditions of polarization of incident light rays are corrected by a polarization-correcting optical multi-layer coating which is formed by alternately depositing a high refractivity layer and a low refractivity layer on curved substrative surface of a predetermined radius of curvature. The transmissive phase plate can be applied to correct conditions of polarization of incident light rays of a polarized beam splitter for the purpose of improving contrast ratio of a projection display.

8 Claims, 6 Drawing Sheets

FIG. 4

| SHAPE | CORRECTING OPT COATING | RADIUS OF CURVATURE | INCIDENT LIGHT | LIGHT LEAKAGE | CONTRAST |
|---|---|---|---|---|---|
| PLANAR | NONE | ∞ | 100% | 1.46% | 69 |
| SPHE-RICAL | $\lambda/2$ | -60R | 100% | 0.06% | 1799 |
| CYLIND-RICAL | $\lambda/2$ | -60R | 100% | 0.08% | 1233 |
| SPHE-RICAL | $\lambda/4$ | -30R | 100% | 0.08% | 1181 |
| CYLIND-RICAL | $\lambda/4$ | -30R | 100% | 0.09% | 1172 |

TRANSMISSIVE PHASE PLATE, POLARIZED BEAM SPLITTER, AND PROJECTION DISPLAY

BACKGROUND OF THE INVENTION

1. Field of the Art

This invention relates to a transmissive phase plate with a function of correcting direction of polarization, a polarized beam splitter embodying the transmissive phase plate for correction of polarization of incident light, and a projection type display incorporating the polarized beam splitter with a polarization-correcting transmissive phase plate.

2. Prior Art

A diversity of projection type display devices like liquid crystal projectors have been introduced and in use, but recently reflective liquid crystal projectors of LCOS (Liquid Crystal on Silicon) technology came into use. Different from transmissive liquid crystal projectors, LCOS reflective liquid crystal projectors have liquid crystal elements drive circuits located on the rear side of reflection mirrors. Therefore, in the case of a LCOS liquid crystal projector, it is possible to realize production of high quality picture images by narrowing gaps between adjacent pixels, in addition to an improvement in brightness of picture images which is realized by a higher numerical aperture.

An LCOS reflective liquid crystal projector is mainly constituted by a light source, a polarized beam splitter and an LCOS reflection panel. A light beam emitted from a light source is fed to a polarized beam splitter which separates a p-polarized component and an s-polarized component of incident light by transmitting and reflecting them depending on direction of polarization. A light component (s-polarized light) reflected by the polarized beam splitter is converted to and reflected as p-polarized light by an LCOS reflection panel when a voltage is applied to the liquid crystal panel (i.e., when the liquid crystal device is in "ON" state), and unconverted and reflected as s-polarized light when no voltage is applied (i.e., when the liquid crystal device is in "OFF" state). A light component reflected off by the LCOS reflection panel is led to enter the polarized beam splitter again. When the liquid crystal device is "ON" the reflected light component is p-polarized light, so that it is transmitted through the polarized beam splitter and projected on a screen. On the other hand, when the liquid crystal device is "OFF" the reflected light component is s-polarized light, so that it is reflected off by the polarized beam and not projected on the screen (no light is projected on the screen).

In this connection, in case incident light on the polarized beam splitter is a divergent light flux, there arises a problem that contrast ratio is degraded by transmission of part of s-polarized light which should be reflected off by the polarized beam splitter. Generally speaking, a polarized beam splitter is provided with a planar polarization splitting film coating at an angle of 45 degrees, with optical characteristics of transmitting and reflecting p- and s-polarizations (or inverse optical characteristics) for a light beam which is incident at an angle of 45 degrees. At this time, the directions of polarization of p- and s-polarized components are determined by the direction of a line normal to the polarization splitting film coating and the direction of propagation of incident light. Therefore, as long as the angle of incidence of entering light is 45 degrees relative to the polarization splitting film coating, the polarized beam splitter gives an performance of intended optical characteristics, i.e., 100% transmission of p-polarized light and 100% reflection of s-polarized light. However, in case the angle of incidence is other than 45 degrees (i.e., in case of light rays with angle dependency), the angle of polarization of angle-dependent light rays is inclined from correct directions of polarization of the p-polarized light or s-polarized light. Namely, in case the direction of polarization of an incident light ray is inclined from a correct direction of polarization for p-polarized light, it contains an s-polarized component along with a p-polarized component. On the other hand, in case the direction of polarization of an incident light ray is inclined from a correct direction of polarization for s-polarized light, it contains a p-polarized component along with an s-polarized component. That is, when the direction of polarization is inclined relative to the direction of polarization of p-polarized light, 100% transmission does not take place because part of light is reflected off. Likewise, when the direction of polarization is inclined relative to the direction of polarization of s-polarized light, 100% reflection does not take place because part of light is transmitted through, resulting in a failure to split light satisfactorily according to intended optical characteristics.

In this connection, if a light flux from a light source is a convergent light flux, it turns to a divergent light flux when reflected off as s-polarized light by an LCOS liquid crystal panel (reflected light when the liquid crystal device is in "OFF" state). As a divergent or convergent light flux enters a polarized beam splitter, a divergent or convergent light flux incident on the polarization splitting film coating contains light rays, which fall on the polarization splitting film coating with a deviated angle of incidence or with an angle of incidence other than 45 degrees depending upon a region of incidence (a region of the polarization splitting film coating on which a light ray is cast). That is, an incident light flux consists of numerous light rays of which right rays in a region on the central optical axis are cast on the separation film layer at an angle of incidence of 45 degrees, which matches the direction of polarization of s-polarized light as determined by the separation film layer, and therefore 100% reflected. However, light rays in a region off the central optical axis of incident light are cast on the separation film layer at an angle other than 45 degrees or at an angle unmatched with the direction of polarization of s-polarized light determined by the separation film layer. Therefore, a divergent or convergent light flux incident on the separation film layer is not reflected 100%, and part of light is transmitted through the separation film layer.

Therefore, part of light rays which should be reflected by a polarized beam splitter is transmitted through and projected on a screen, giving rise to a problem of degradations in contrast ratio of picture images projected on a screen. Especially, light rays in marginal end regions are cast at an angle which is largely deviated from 45 degrees, making the degradation in contrast ratio more conspicuous.

It is not only LCOS liquid crystal projector that suffers from the above-discussed problem. Degradations in contrast ratio due to the angle dependency of incident light on a polarized beam splitter also occur in other liquid crystal projectors.

In an attempt to solve this problem of degradations in contrast ratio, Japanese Laid-Open Patent Application H10-282340 discloses a polarized beam splitter which is provided with a polarization splitting film coating and a phase plate layer.

In the polarized beam splitter which is disclosed in the just-mentioned Japanese Laid-Open Patent Application H10-282340, a polarization splitting film coating is formed on one of two prism members each in the shape of a right-angle isosceles triangle pole, and a phase plate layer is formed on the other or second prism member. Therefore, as clear from FIG. 1 of Japanese Laid-Open Patent Application H10-282340, the polarization splitting film coating and phase plate layer are disposed face to face in parallel relation.

In this case, in order for the phase plate layer to function as a λ/4 wave plate for all of incident light rays, it is necessary to impart the phase plate layer a function of controlling the direction of polarization. Incident light falls on the phase plate layer at an angle of 45 degrees in a center region on the optical axis but at different angles in other regions. Thus, the phase plate layer should be able to control the direction of polarization to function as a λ/4 wave plate for all of incident light rays in different regions. Therefore, the phase plate layer of above-mentioned Japanese Laid-Open Patent Application H10-282340 is deposited as a columnar structure growing in a normal direction. That is to say, the phase plate layer of Japanese Laid-Open Patent Application H10-282340 is deposited in a special form for the purpose of controlling the direction of polarization.

Alternatively, it is possible to resort to an optical film or quartz plate for the function of a λ/4 wave plate instead of depositing a columnar structure which grows in a normal direction. By the action of a crystal axis which exists in an optical film or quartz plate, direction of polarization can be controlled also in regions other than a center region on the optical axis. However, an optical film has a problem that it is unsatisfactory in resistance to weather, and a quartz plate has an inherent problem that it is limited in size.

DISCLOSURE OF THE INVENTION

In view of the foregoing situations, it is an object of the present invention to prevent degradations in contrast ratio of projected picture images which usually take place when a divergent or convergent light flux is fed to a polarized beam splitter, using a polarization-correcting optical multi-layer coating (hereinafter referred to simply as "correcting optical multi-layer coating" for brevity) which is formed by alternately laminating a high refractivity layer and a low refractivity layer, without resorting to a special deposition film or crystal axis.

According to the present invention, in order to achieve the above-stated objective, there is provided a transmissive phase plate which comprises a correcting optical multi-layer coating formed on a curved surface of a transparent substrate by alternately depositing a high refractivity layer and a low refractivity layer functioning as a wave plate, the correcting optical multi-layer coating being imparted with a function of correcting conditions of polarization of an incident divergent or convergent light flux.

Further, according to the present invention, there is provided a polarized beam splitter embodying the above-described transmissive phase plate, i.e., there is provided a polarized beam splitter having a polarization separating coating adapted to transmit one of p- and s-polarizations and to reflect off the other polarization, characterized in that the polarized beam splitter comprises: a correcting optical multi-layer coating formed on a curved surface of a transparent substrate by alternately depositing a high refractivity layer and a low refractivity layer functioning as a wave plate, and located on an input side of the polarization separating coating; the correcting optical multi-layer coating being imparted with a function of correcting direction of polarization of incident light rays before entering the polarization separating coating.

Further, according to the present invention, there is provided a projection display incorporating the polarized beam splitter in a light path to or from a light source and a reflective light valve at the task of modulating and controlling polarizing direction.

The above and other objects, features and advantages of the present invention will become apparent from the following particular description, taken in conjunction with the accompanying drawings which show by way of example some preferred embodiments of the present invention. Needless to say, the present invention should not be construed as being limited to particular forms shown in the drawings.

BRIEF DESCRIPTION OF THE DRAWINGS

In the accompanying drawings:

FIG. 4 is a table showing comparative examples;

DESCRIPTION OF PREFERRED EMBODIMENTS

Figure 1:
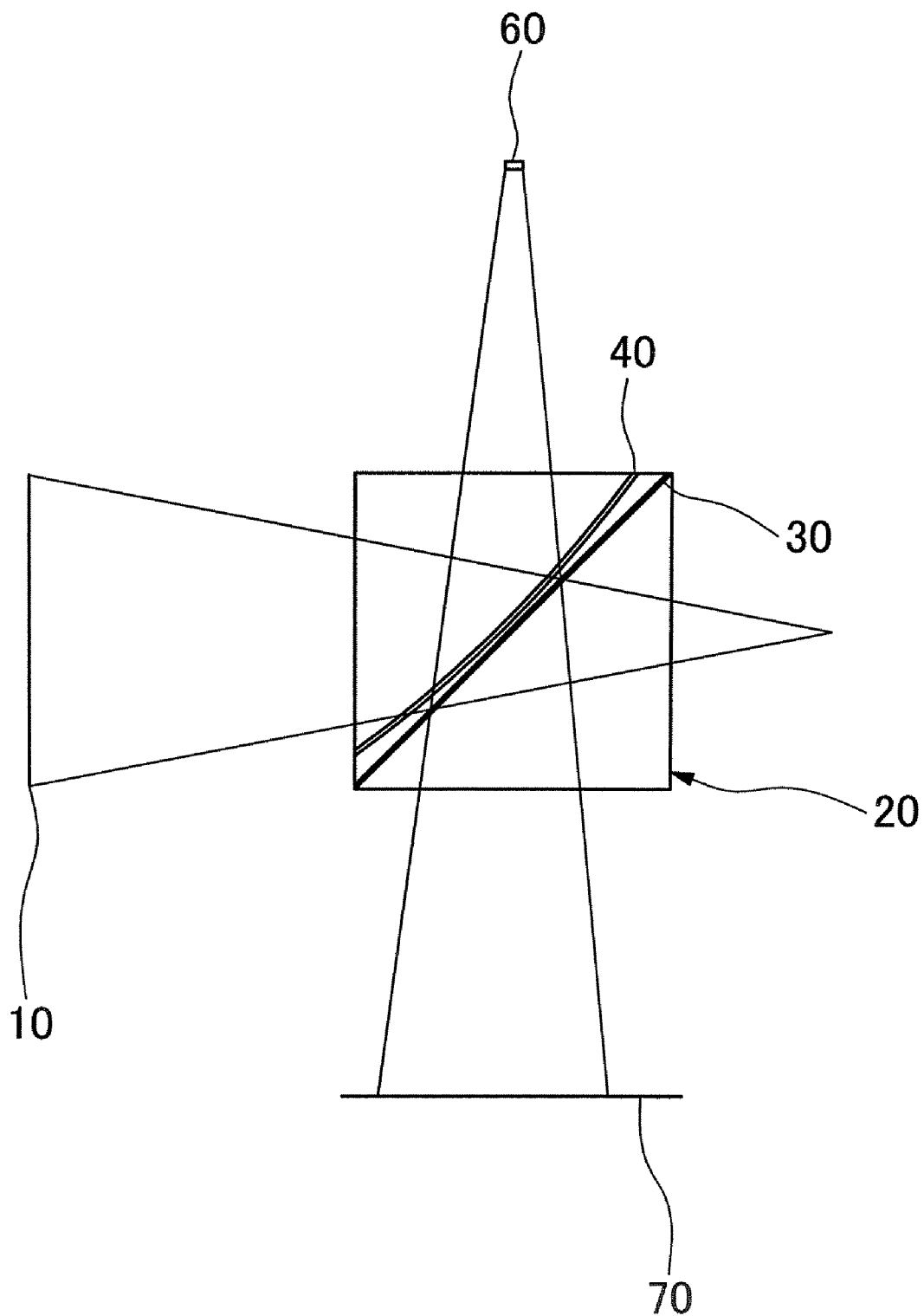
FIG. 1 is a schematic view of a projection display.

Hereafter, the present invention is described more particularly by way of its preferred embodiments with reference to the accompanying drawings. Shown in FIG. 1 is an LCOS reflection type liquid crystal projector as an example of a projection display to which the present invention is applicable. Here, the present invention is described by way of an LCOS projection type liquid crystal projector, but it should be understood that the present invention can be applied to other projection type displays such as transmission type liquid crystal projector or the like. In FIG. 1, the projection type display according to the invention includes a light source 10, polarized beam splitter 20, reflective light valve 60 and screen 70. Arbitrary light such as random polarization light or linear polarization light like p- or s-polarized light is emitted from the light source 10. Light from the light source 10 is in the form of a convergent light flux which is converged toward the reflective light valve 60. Of the light flux from the light source 10, either p-polarized component or s-polarized component is transmitted through the polarized beam splitter while the other component is reflected off. In this instance, the polarized beam splitter 20 is adapted to transmit p-polarized light and reflect s-polarized light. That is, the polarized beam splitter 20 is adapted to reflect s-polarized light toward the reflective light valve 60.

The reflective light valve 60 modulates the direction of polarization of incident light with respect to each selected pixel (ON) and unselected pixel (OFF). The reflective light valve 60 has switching devices arrayed correspondingly to the respective pixels to apply a voltage to the respective pixels by way of the corresponding switching devices. As a voltage is applied, liquid crystal molecules changes the direction of alignment. That is, in the case of the reflective light valve 60, liquid crystal molecules are aligned in a direction in which the direction of polarization of incident light is rotated through 90 degrees. Therefore, when a pixel is in the selected state, incident p-polarized light is modulated into p-polarized light and reflected toward the polarized light beam splitter 20. On the other hand, when a pixel is in the unselected state, no voltage is applied to liquid crystal molecules and no change occurs to the direction of alignment of liquid crystal molecules. Therefore, incident s-polarized light is reflected as it is toward the polarized beam splitter 20 without undergoing any modulation.

As explained above, the polarized beam splitter 20 is imparted with optical characteristics to transmit p-polarized light while reflecting s-polarized light. Therefore, reflected light from the reflective light valve 20 is p-polarized light, it is projected on the screen. In case reflected light is s-polarized light, it is reflected toward the light source 10. Thus, a white state (a pixel in selected state) and a black state (a pixel in unselected state) can be projected on the screen 70.

Figure 2:
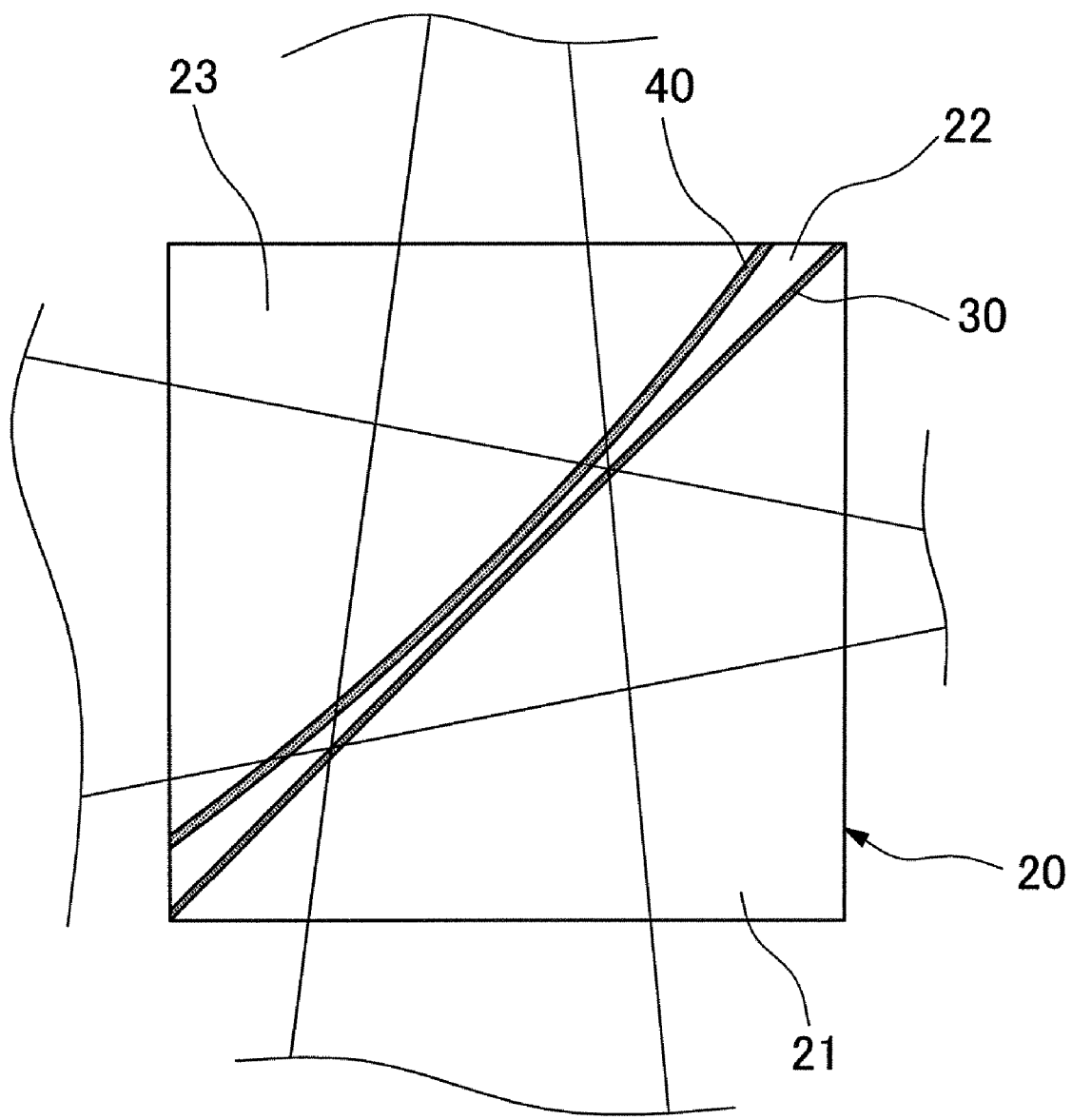
FIG. 2 is a schematic illustration explanatory of construction of a polarized beam splitter.

As shown in FIG. 2, a polarization splitting film coating 30 and a correcting optical multi-layer coating 40 are provided on the polarized beam splitter 20. The polarization splitting film coating 30 is an optical multi-layer coating which is imparted with optical characteristics to transmit p-polarized light and reflect off s-polarized light. Thus, functions of the polarized beam splitter 20 are achieved and controlled by way of the properties of the polarization splitting film coating 30. The polarization splitting film coating 30 of FIG. 2 is arranged to transmit p-polarized component and reflect off s-polarized component of an incident light beam entering at an angle of 45 degrees.

As shown in FIG. 1, the projection display employs the light source 10 which emits a convergent light flux, which is converged toward the reflective light valve 60. The use of a convergent light flux as a light source contributes to downsize the projection display as a whole into a compact form since a collimator lens and a condensing lens are dispensable in this case. When reflected back from the reflective light valve 60 to re-enter the polarized beam splitter 20, the convergent light flux turns to a divergent light flux, with angle dependency relative to the polarization splitting film coating 30. In this instance, if an incident light flux on the polarization splitting film coating 30 is of an angle dependent light rays, part of a reflecting light component is transmitted through and part of a transmitting light component is reflected off the separation film coating 30. Namely, in case a light ray incident on the polarization splitting film coating 30 is an angle dependent light ray, the angle of polarization of the incident light ray is inclined relative to the direction of polarization of p- or s-polarized light. That is, a light ray which is inclined in direction of polarization contains an s- or p-polarized component along with a p- or s-polarized component, so that it is impossible for the polarization splitting film coating 30 to transmit or reflect the incident light ray 100%. As a result, part of transmitting or reflecting light is reflected off or transmitted through the polarization splitting film coating 30. In this case, light reflected off the reflective light valve 60 is s-polarized light. But, if light incident on the polarization splitting film coating 30 is inclined relative to the direction of polarization of s-polarized light, part of incident light is transmitted through the polarization splitting film coating 30 to cause a drop in contrast ratio of a projected picture image. Namely, as a result of transmission of part of a light beam which should have been 100% reflected off by the polarization splitting film coating 30, a drop in contrast ratio occurs since a pixel which should be held at a "black" level on a screen cannot be held at a "black" level.

Thus, according to the present invention, as shown in FIGS. 1 and 2, the polarized beam splitter 20 is provided with a correcting optical multi-layer coating 40 on a curved surface on the side of entrance of a light beam reflected off by the reflective light valve 60. A polarization splitting film coating 30 is formed on an output side of the polarized beam splitter 20. The correcting optical multi-layer coating 40 is an optical multi-layer coating which is formed by alternately laminating a high refractivity film layer and a low refractivity film layer one after another on a curved surface of a glass element (e.g., a glass substrate). Since the correcting optical multi-layer coating 40 is formed on a curved surface, it can function as a wave plate. The convergent light flux incident on the polarization splitting film coating 30 is a flux of angle dependent light rays, and part of incident light is transmitted to cause a drop in contrast ratio. In order to solve this problem, the correcting optical multi-layer coating which is formed on a curved surface of a glass element is located on the input side of the polarized beam splitter 20 (i.e., located in a position immediately anterior to the polarization splitting film coating 30), which is located on the output side of the polarized beam splitter (i.e., located on the side where a reflected and transmitted light flux leaves the polarized beam splitter 20). By the correcting optical multi-layer coating 40, the direction of polarization of light rays in regions off the optical axis is corrected to improve the contrast ratio, in the manner as described in greater detail below.

The correcting optical multi-layer coating 40 according to the present invention is an optical multi-layer coating which is constructed to satisfy the following two conditions: (1) an optical film coating capable of producing a predetermined phase differential between perpendicularly polarized components (e.g., between p- and s-polarized components) of a light flux incident on the correcting optical multi-layer coating 40; and (2) an optical film coating which is formed on a curved surface. In order to satisfy the condition (1) above, the correcting optical multi-layer coating 40 is formed in an aimed construction through selection of suitable high and low refractivity materials (i.e., selection of materials in desired properties in refractivity), and control of thickness of high and low refractivity layers and the number of alternately laminated high and low refractivity layers. The selection of high and low refractivity materials and the thickness and number of high and low refractivity layers vary depending upon the phase differential to be produced between p- and s-polarized components in an incident light beam. Examples of high refractivity material which can be be applied to the correcting optical multi-layer coating 40 include $Ta_2O_5$, $TiO_2$, $Nb_2O_5$, $AL_2O_3$ and the like. Examples of low refractivity material include $SiO_2$, $MgF_2$ and the like. The number and thickness of high and low refractivity layers are controlled according to selected materials. The number of high and low refractivity layers can be controlled by way of the number of deposition cycles, while the thickness can be controlled by way of deposition time.

For instance, in a case $Ta_2O_5$ and $SiO_2$ are selected for high and low refractivity layers, respectively, the high and low refractivity layers are laminated in 40 layers in total to produce a phase differential of 180 degrees between p- and s-polarized light components.

An optical multi-layer film coating which satisfies the above-mentioned condition (1) alone (i.e., an optical multi-layer coating deposited on a plane surface) is effective as long as a plane of incidence of a light beam is not at a zero angle relative to the direction of polarization of p- and s-polarized light. Namely, the optical multi-coating film layer is unable to produce a phase differential when the direction of polarization of incident light coincides with the direction of polarization of p- or s-polarized light, and incident light is transmitted as it is. In this regard, the directions of polarization of p- and s-polarized light are determined by a plane of incidence which is formed by a normal line to the polarization splitting film coating 30 and a direction of propagation of incident light. Namely, a light ray vibrating in or along the plane of incidence is defined as "p-polarized light" while a light ray vibrating perpendicularly to the plane of incidence is defined as "s-polarized light."

In this connection, if a planar optical multi-layer film coating which satisfies the condition (1) above is located on an input side anterior to the polarization splitting film coating 30 and in parallel relation with the latter, it impossible for p- and s-polarized light to act as an advancing axis and a retarding axis, respectively, because the direction of polarization of light incident on that planar optical multi-layer film coating matches with that of s-polarized light. Namely, since there is no difference in refractivity in the travel direction of light, the planar optical film coating cannot perform the function of producing a phase differential between p- and s-polarizations, and incident light is merely transmitted as it is. Thus, in order to let p- and s-polarized light as an advancing axis and a retarding axis, respectively, it is necessary to incline incident light rays relative to the polarization splitting film coating 30 except light rays in a center region on the optical axis.

For this reason, an optical multi-layer film coating which satisfies the condition (1) above is formed on a curved surface with a predetermined radius of curvature (the above-mentioned condition (2)). As clear from FIG. 2, of light rays which are incident on the correcting optical multi-layer coating 40, those light rays in a center region on the optical axis are transmitted through the apex of the correcting optical multi-layer coating 40 (a point which is nearest to the polarization splitting film coating 30). At this time, the direction of polarization of light rays at the central optical axis is not corrected. That is, a tangent to the apex of the correcting optical multi-layer coating 40 lies parallel with the plane of the polarization splitting film coating 30. In other words, the direction of a normal line to the apex of the correcting optical multi-layer coating 40 matches with the direction of a normal line to the polarization splitting film coating 30. In this instance, as shown in FIG. 2, light rays incident at the central optical axis coincide with the above-mentioned apex point. Therefore, light rays incident at the central optical axis, which match the direction of polarization of s-polarized light, are transmitted as they are without undergoing a phase shift.

On the other hand, since the correcting optical multi-layer coating 40 is formed on a curved surface, the direction of polarization of light rays which are incident in regions off the apex of the correcting optical multi-layer coating 40 differs from that of p- or s-polarized light which is determined by the polarization splitting film coating 30. Accordingly, the direction of polarization of light rays off the central optical axis is rotated by phase shift and thus corrected. Especially, an apex region of the correcting optical multi-layer coating 40, which is formed on a curved surface, is disposed virtually parallel with the polarization splitting film coating 30, so that rotation of the direction of polarization takes place only sparingly. However, since the angle of inclination of the correcting optical multi-layer coating 40 relative to the polarization splitting film coating 30 increases gradually toward outer end regions from the apex region on the central optical axis, the direction of polarization is corrected in a greater degree in outer end regions. Of light rays incident on the correcting optical multi-layer coating 40, a light ray at the central optical axis is passed through the apex of the correcting optical multi-layer coating 40, but the angle dependency of incident light rays becomes greater in the regions which are more distant from the central optical axis. That is to say, the direction of polarization is corrected in a smaller degree in regions in the vicinity of the central optical axis where the angle dependency is smaller, but corrected in a greater degree in outer end regions where the angle dependency is larger. Thus, the direction of polarization of light rays incident on the correcting optical multi-layer coating, which is formed on a curved surface, can be corrected into agreement with the direction of polarization of s-polarized light by the polarization splitting film coating 30. In this instance, the correcting optical multi-layer coating 40 is deposited on a curved surface with such a radius of curvature capable of correcting the direction of polarization of all of incident light rays upon transmission therethrough, into a direction in agreement with the direction of polarization of s-polarized light by the polarization splitting film coating 30.

In this instance, the correcting optical multi-layer coating 40 can function as a $\lambda/4$ wave plate to produce a phase shift of 90 degrees or as a $\lambda/2$ wave plate to produce a phase shift of 180 degrees. The radius of curvature of the correcting optical multi-layer coating varies depending upon the angle of the phase shift to be produced, and therefore needs to be controlled appropriately through selection of high and low refractivity materials and the number and thickness of high and low refractivity layers to be laminated.

As clear from FIG. 1, a light flux of s-polarized light from the light source 10 is passed through the correcting optical multi-layer coating 40 back and forth for two times in total, i.e., when it is cast on and reflected off by the polarization splitting film coating 30 and when it is cast on (input to) the polarization splitting film coating 30 again after modulation by the reflective light valve 60. Namely, before and after being modulated and reflected by the reflective light valve 60, the s-polarized light is passed twice through the correcting optical multi-layer coating 40 which functions as a wave plate. Thus, the correcting optical multi-layer coating 40 on a curved surface is controlled to such a radius of curvature that the direction of polarization of light rays off the central optical axis is corrected into agreement with the direction of polarization of s-polarized light determined by the polarization splitting film coating 40 after two transmissions through the correcting optical multi-layer coating 40. Of course, arrangements may be made to correct the direction of polarization by one transmission. Namely, in the case of the projection display of FIG. 1, light rays are transmitted two times through the correcting optical multi-layer coating 40 which functions as a wave plate. In other application of the correcting optical multi-layer coating 40, it is possible to make arrangements to transmit input light rays through the correcting optical coating 40 for a single time for correcting the direction of polarization into agreement with the direction of polarization of s-polarized light determined by the polarization splitting film coating 30.

The polarized beam splitter 20 is constituted by the polarization splitting film coating 30 and the correcting optical multi-layer coating 40. That is to say, the polarized beam splitter 20 has two surfaces for deposition of two optical multi-layer coatings. In case the polarized beam splitter 20 is in the form of a cubic prism, it is composed of three substrate members of glass, i.e., a first substrate member 21, a second substrate member 22 and a third substrate member 23. The first substrate member 21 is in the form of a triangle pole. An inclined plane of the triangle pole is a joint surface to be bonded to the second substrate member 22. The third substrate member 23 is provided with a convex curved surface instead of an inclined plane. The second substrate member 22 is integrally joined with the first and second substrate member 21 and 23 to constitute the cubic polarized beam splitter 20, and provided with joint surfaces on the opposite sides to be joined with the first and third substrate members 21 and 23, respectively. More specifically, the second substrate member 22 is provided with a complementary concave joint surface on the side of the third substrate member 23 and a planar joint surface on the side of the first substrate member 21.

The polarization splitting film coating 30 is formed on one of joint surfaces of the first and second substrate members 21 and 22 to be bonded to each other. The correcting optical multi-layer coating 40 is formed on one of joint surfaces of the second and third substrate members 22 and 23 to be bonded to each other. The polarized beam splitter 20 of a cubic shape is employed in the above-described example. However, needless to say, polarized beam splitters of other shapes can be employed if desired.

The curved surface bearing the correcting optical multi-layer coating 40 has a radius of curvature which is determined in the manner as follows. The center of curvature of the curved surface for deposition of the correcting optical multi-layer coating 40 is located at a point which is obtained by inclining the light source 10 or the reflective light valve 60 through 45 degrees from an apex point of the correcting optical multi-layer coating 40. The curved surface is formed in a curvature of a smaller radius in case the correcting optical multi-layer coating 40 is intended to function as a $\lambda/2$ wave plate, but formed in curvature of a larger radius in case the correcting optical multi-layer coating 40 is intended to function as a $\lambda/4$ wave plate. With a large radius of curvature, however, it may become difficult to control the angle of marginal end portions of the curved surface. Therefore, a $\lambda/2$ wave plate is superior to a $\lambda/4$ wave plate in correcting the direction of polarization.

In order to correct the direction of polarization appropriately, the radius of curvature (expressed by letter R) of the correcting optical multi-layer coating 40 is preferred to be in the following range. The radius of curvature R of the substrative curved surface of the correcting optical multi-layer coating 40 is preferred to be in the range of $L/2 <= R <= infinity$ in the direction of X-axis and in the range of $L/2 <= R <= 10 L$ in the direction of Y-axis, where Z-axis is a direction of a light ray which travels away from the reflective light valve 60 and falls on the correcting optical multi-layer coating 40 at the central optical axis, Y-axis is a direction of a plane of incidence (formed by a line normal to the polarization splitting film coating 30 and a travel direction of a light ray incident at the central optical axis), X-axis is a direction perpendicular to Y-axis, and L is a distance between a curved surface bearing the correcting optical multi-layer coating 40 and the reflective light valve 60.

The correcting optical multi-layer coating 40 on a curved surface can be in a spherical aspherical or cylindrical shape. However, in order to increase the angle of inclination toward marginal end regions, ideally an aspheric shape is preferred. Nevertheless, it is possible to make corrections to a sufficient degree even if the correcting optical multi-layer coating 40 is formed in a spherical, cylindrical or other curved shape.

In regard to the function of the correcting optical multi-layer coating 40 as a wave plate, the angle of phase shift can be adjusted by controlling not only the radius of curvature but also substances and thicknesses of its high and low refractivity layers.

Figure 3:
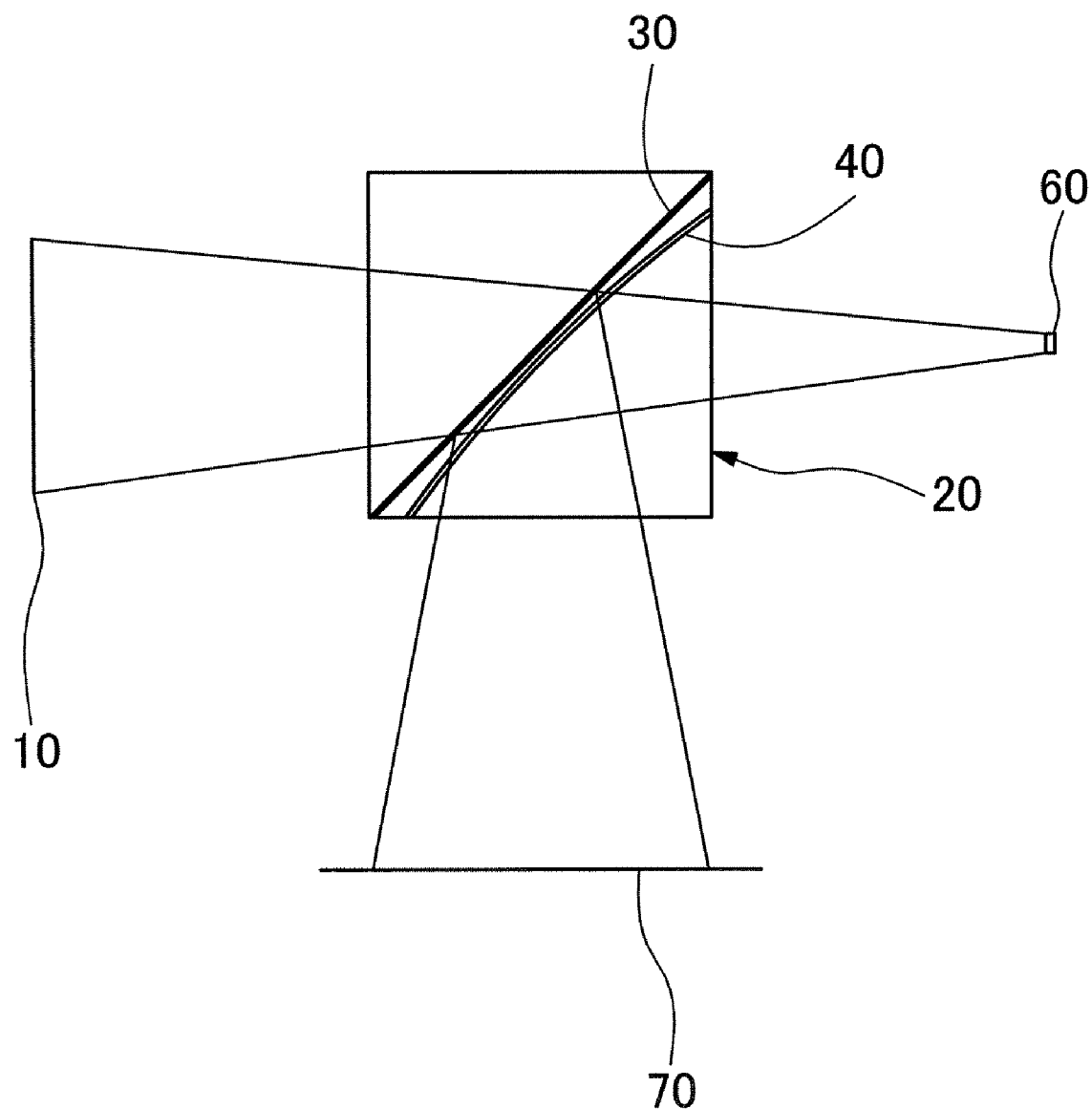
FIG. 3 is a schematic view of a projection display adopted in another embodiment.

The projection display shown in FIG. 1 is arranged to utilize s-polarized light which is reflected off by the reflective light valve 60. However, arrangements may be made to utilize transmitted p-polarized light. For example, as shown in FIG. 3, when a light flux from the light source 10 is shed on the polarization splitting film coating 30, only p-polarized light is transmitted therethrough. At the reflective light valve 60, pixels which should be retained at "black" level are reflected as p-polarized light without modulation but pixel which should be retained at "white" level are modulated from p- to s-polarized light at the time of reflection. Light rays which are reflected off by the reflective light valve 60 for input to the polarization splitting film coating 30 are transmitted through the correcting optical multi-layer coating 40 which is formed on a curved surface. Accordingly, the direction of polarization of light rays in regions off the central optical axis is corrected into agreement with the direction of p-polarized light by the correcting optical multi-layer coating 40, preventing p-polarized light from being reflected on the screen due to angle dependency instead of being transmitted through the polarization splitting film coating 30. Thus, improvements in contrast can be achieved also in the case of the projection display of FIG. 3.

Shown in FIG. 4 are comparative examples applying a correcting optical multi-layer coating according to the present invention as described above. More particularly, shown in FIG. 4 are comparative examples of contrast, obtained by a benchmark test in which a laser beam of a wavelength of 450 nm and of an F-number of 2.5 is fed to the polarized beam splitter 20. As seen in FIG. 4, the percentage of light leak (a percentage of light which is transmitted through the polarization splitting film coating 30, in the total amount of light which is reflected off by the reflective light valve 60) is as large as 1.46% in case the correcting optical multi-layer coating 40 is absent. As a result, the contrast ratio (incident light/leaked light) is inferior in this case. On the other hand, the percentage of light leak is smaller in case the correcting optical multi-layer coating 40 is incorporated, regardless of the shape of the optical multi-layer coating 40, i.e., a spherical shape or a cylindrical shape, and no matter whether the correcting multi-layer 40 is arranged to function as a $\lambda/2$ wave plate or as a $\lambda/4$ wave plate, realizing a high contrast ratio. It is easier to control the radius of curvature in case of a spherical shape than a cylindrical shape, and in case of a $\lambda/2$ wave plate than a $\lambda/4$ wave plate. The percentage of light leakage can be suppressed to 0% by forming the curved surface in an aspherical shape and in an appropriate radius of curvature.

As explained above, the correcting optical multi-layer coating 40 which is adapted to produce a predetermined phase differential between p- and s-polarizations is provided on the polarized beam splitter 20 at a position anterior to the polarization splitting film coating 30, correcting the direction of polarization of incident light rays when inclined relative to the direction of polarization determined by the polarization splitting film coating 30. Thus, when applied to a projection display using a divergent or convergent light flux, it becomes possible to prevent leak transmission which occurs to part of a light flux (s-polarized light) which should be reflected off by the polarization splitting film coating 30, preventing degradations in contrast ratio. That is to say, the present invention makes it possible to improve the contrast ratio without resorting to a special deposition film or crystal axis.

Figure 5:
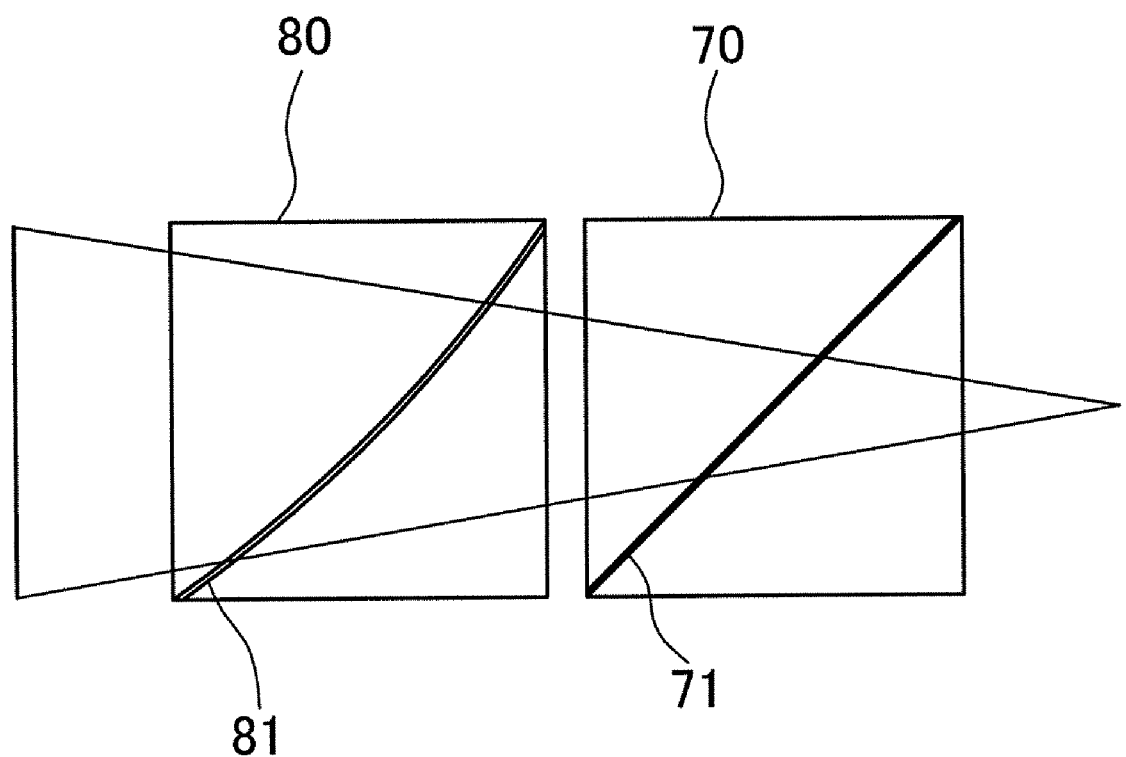
FIG. 5 is a schematic view explanatory of a polarized beam splitter and a transmissive phase plate in a separated state.

In the above-described embodiments, the correcting optical multi-layer coating 40 is provided on a polarized beam splitter 40. Namely, in the foregoing embodiments, the correcting optical multi-layer coating 40 is provided on a polarized light beam splitter 20 along with the polarization splitting film coating 30, thereby correcting the direction of polarization of incident light rays before falling on the polarization splitting film coating 30. In this regard, it is possible to provide the correcting optical multi-layer coating 40 and the polarization splitting film coating 30 respectively on separate parts as shown in FIG. 5. In the case of FIG. 5, a transmissive phase plate 80 with a correcting optical multi-layer coating 81 is provided separately from a polarized beam splitter 70 with a polarization splitting film coating 71.

In this instance, as for the polarized beam splitter 70 with the polarization splitting film coating 71, there may be employed a polarizing beam splitter which has a layer of the polarization splitting film coating 71 formed internally of a cubic prism. Of course, there may be employed a polarized beam splitter of other form. As a divergent or convergent light flux is cast toward the polarization splitting film coating 71 of the polarized beam splitter 70, the direction of polarization of light rays in marginal end regions is corrected by the transmissive phase plate 80 which is located in a position anterior to the polarized beam splitter 70. This transmissive phase plate 80 is an optical element (which functions as a wave plate) for producing a predetermined phase differential between p- and s-polarizations, and provided with the correcting optical multi-layer coating 81 on the input side similarly to the correcting optical multi-layer coating 40 in the foregoing embodiments.

The correcting optical multi-layer coating 81 is formed by alternately laminating a high refractivity layer and a low refractivity layer, and no crystal axis exists therein. Therefore, when incident light rays perpendicularly fall on the correcting optical multi-layer coating 81, it is difficult to establish a phase differential between p- and s-polarizations because p- and s-polarized light cannot act as an advancing axis and a retarding axis, respectively. Therefore, the correcting optical multi-layer coating 81 of the transmissive phase plate 80 is formed on a curved surface. In case the correcting optical multi-layer coating 80 is formed on a curved surface in this way, normal lines to the curved surface are inclined relative to incident light rays, making it possible for p- and s-polarizations to act as advancing and retarding axes, respectively. Accordingly, the transmissive phase plate 80 can establish a phase differential between p- and s-polarizations while correcting the direction of polarization of incident light rays.

In case the transmissive phase plate 80 is provided separately from the polarized beam splitter 70 as described above, it is located in a position anterior to the polarized beam splitter 70 in the light path of incident light rays. When incident light is a divergent or convergent light flux, the direction of polarization of incident light rays is corrected upon transmission through the transmissive phase plate 80 to solve the problem that it becomes difficult for the polarized beam splitter 70 to give a performance of intended optical characteristics when the direction of polarization of incident light rays is inclined.

In this instance, the transmissive phase plate 80 itself has a function of correcting the direction of polarization of incident light rays. For example, in case the correcting optical multi-layer coating 61 is adapted to function as a λ/4 wave plate, linearly polarized light is converted to circularly polarized light upon transmission through the correcting optical multi-layer coating 81 of the transmissive phase plate 80. However, in case incident light is a divergent or convergent light flux, light rays in regions off the central optical axis are not at the angle of 45 degrees with the correcting optical multi-layer coating 81 in direction of polarization. Thus, in this case the incident light is changed to elliptically polarized light instead of circularly polarized light. To solve this problem, the direction of polarization of incident light is corrected by the correcting optical multi-layer coating 61 which is formed on a curved surface of the transmissive phase plate 80. In other words, upon transmission through the correcting optical multi-layer coating 81, all of light rays in a divergent or convergent light flux are polarized matched with each other in direction of polarization and in conditions of polarization.

Figure 6A:
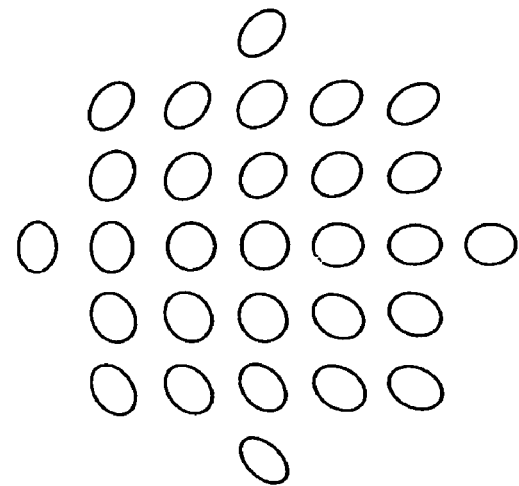
FIGS. 6(a) and 6(b) are a schematic illustration explanatory of conditions of polarization after transmission through planar and curved correcting optical multi-layer coatings.
Figure 6B:
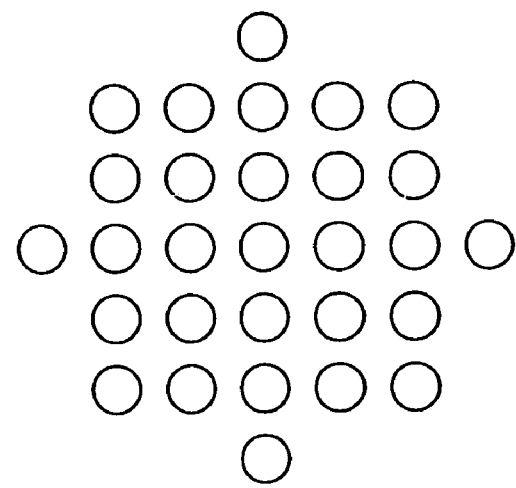

Shown at (a) of FIG. 6 is a pattern of polarization of transmitted light rays in a case where the correcting optical multi-layer coating 81 is formed on a planar surface instead of a curved surface, and shown at (b) of the same figure is a pattern of polarization of transmitted light rays in a case where the correcting optical multi-layer coating 81 is formed on a curved surface. As seen in FIG. 6(*a*), transmitted light rays in regions off the central optical axis are elliptically polarized in case the correcting optical multi-layer coating 81 is formed on a planar surface. In contrast, as seen in FIG. 6(*b*), transmitted light rays in regions off the central optical axis are put in corrected conditions of polarization and circularly polarized in case the correcting optical multi-layer coating 81 is formed on a curved surface.

What is claimed is:

1. A polarized beam splitter having a polarization separating coating adapted to transmit one of p- and s-polarizations and to reflect off the other polarization, said polarized beam splitter comprises:
   said polarized beam splitter being composed of a first substrate member, a second substrate member and a third substrate member;
   said first substrate member having an incident surface of light from a light source and a curved joint surface;
   said second substrate member having a curved joint surface to be bonded against said curved joint surface of said first substrate and a flat opposite surface;
   said third substrate member having a flat joint surface to be bonded against said flat opposite surface of said second substrate member;
   said polarization separating coating being formed on either of said joint surfaces between said second and third substrate members;
   a correcting optical multi-layer coating comprising a high refractive layer and a low refractive layer being formed on either of said curved joint surfaces between said first and second substrate members;
   said correcting optical multi-layer coating formed on one of said curved joint surfaces functioning as a wave plate;
   said correcting optical multi-layer coating being imparted with a function of correcting a direction of polarization of incident light rays before entering said polarization separating coating.

2. A polarized beam splitter as defined in claim 1, wherein said correcting optical multi-layer coating is formed in a radius of curvature for correcting a direction of polarization of an incident divergent or convergent light flux into agreement with a direction of polarization determined by said polarization separating coating.

3. A polarized beam splitter as defined in claim 1, wherein at least one of the curved surface is formed in a aspheric, spheric or cylindrical shape.

4. A polarized beam splitter as defined in claim 1, wherein said correcting optical multi-layer coating is adapted to function as a λ/4 wave plate.

5. A polarized beam splitter as defined in claim 1, wherein said correcting optical multi-layer coating is adapted to function as a λ/2 wave plate.

6. A polarized beam splitter as defined in claim 1, wherein said high the refractive layer of said correcting optical multi-layer coating is formed of at least one of $Ta_2O_5$, $TiO_2$, $Nb_2O_5$ and $Al_2O_3$ and said low the refractive layer is formed of at least one of $SiO_2$ and $MgF_2$.

7. A projection display incorporating the polarized beam splitter of claim 1 in a light path to or from said light source and a reflective light valve for modulating and controlling polarizing direction.

8. A projection display as defined in claim 7, wherein the curved surface bearing said correcting optical multi-layer coating is formed in a radius of curvature in the range of $L/2<=R<=$infinity in the direction of X-axis and in the range of $L/2<=R<=10L$ in the direction of Y-axis, where Z-axis is a direction of propagation of light rays at a central optical axis of a incident light flux on said polarized beam splitter, Y-axis is a direction in which a plane of incidence is formed by a line normal to said polarization separating coating and said direction of propagation of light rays at said central optical axis, X-axis is a direction perpendicular to said Y-axis, L is a distance between said reflective light valve and said curved surface bearing said correcting optical multi-layer coating and R is a radius of curvature of the correcting optical multi-layer coating.

* * * * *